United States Patent [19]
Kim et al.

[11] Patent Number: 5,773,948
[45] Date of Patent: Jun. 30, 1998

[54] SERVO CONTROL GAIN CORRECTION METHOD OF DISK RECORDING SYSTEM

[75] Inventors: Joon-Bae Kim; Sung-Yeoul Park, both of Seoul, Rep. of Korea

[73] Assignee: SamSung Electronics Co., Ltd., Suwon, Rep. of Korea

[21] Appl. No.: 560,178

[22] Filed: Nov. 17, 1995

[30] Foreign Application Priority Data

Nov. 17, 1994 [KR] Rep. of Korea ................... 1994-30263

[51] Int. Cl.$^6$ .................................................. G11B 5/596
[52] U.S. Cl. ................. 318/561; 318/568.22; 360/78.04
[58] Field of Search .............................. 360/78.01, 78.04, 360/78.06, 78.07, 78.09, 78.11; 318/560, 561, 565, 568.22, 606–612, 632, 633

[56] References Cited

U.S. PATENT DOCUMENTS

| | | | |
|---|---|---|---|
| 5,189,571 | 2/1993 | Murphy et al. | 360/75 |
| 5,206,570 | 4/1993 | Hargarten et al. | 318/611 |
| 5,305,160 | 4/1994 | Funches et al. | 360/78.07 |
| 5,333,083 | 7/1994 | Nakano | 360/77.04 |
| 5,369,345 | 11/1994 | Phan et al. | 318/561 |
| 5,404,255 | 4/1995 | Kobayashi et al. | 360/78.09 |
| 5,457,587 | 10/1995 | Suzuki | 360/77.04 |

*Primary Examiner*—Brian Sircus
*Attorney, Agent, or Firm*—Robert E. Bushnell, Esq.

[57] ABSTRACT

A servo control method of a disk recording system enhanced with a servo control gain correction method. In a disk recording system for reading and writing information upon a disk recording medium by driving an actuator, the system contemplates supplying a given reference current to the actuator and calibrating a current moving distance of the actuator on the disk recording medium while it is rotated at a constant speed during a reference time, obtaining a distance difference between a given reference moving distance and the current moving distance, and obtaining a correction gain of the actuator in proportion to a given reference direct current gain value from the distance difference. The actuator is then driven in correspondence to the correction gain upon moving a head to a desired target position to read or write data on the disk recording medium.

12 Claims, 4 Drawing Sheets

SERVO CONTROL GAIN CORRECTION METHOD OF DISK RECORDING SYSTEM

CROSS-REFERENCE TO RELATED APPLICATIONS

This application makes reference to, incorporates the same herein and claims all benefits accruing under 35 U.S.C. §119 from an application entitled A SERVO CONTROL GAIN CORRECTION METHOD OF DISK RECORDING SYSTEM earlier filed in the Koran Industrial Property Office on 17 Nov. 1994 , and duly assigned Ser. No. 30263/1994 by that Office.

BACKGROUND OF THE INVENTION

Field of the Invention

The present invention relates to an improved servo control method of a disk recording system, and more particularly, to a servo control gain correction method and apparatus for calibrating variation in the moving force gain of a head actuator.

In general, disk recording systems, a magnetic disk is used as a recording medium; the magnetic disk is divided along the radial direction into a plurality of tracks. In a sector servo system, servo information interspersed with data is recorded on each track and is read for executing servo control of the recording system. In order to read and write data on the disk, a seek operation is initially performed to move the head from a current position to a target position. After the head has reached a target track, a track following operation is performed for accurately placing the head on a data line of the target position. In a method of controlling the position of a head in the disk recording system, velocity control is performed until the head reaches the target position, and position control is performed at the target position, in order to position the head on-track.

I have observed that the several types of voice coil motors currently used to position the read and write head in a disk recording system vary significantly in their operational and functional characteristics however, without any uniform standard applied to these characteristics. When a constant current is applied to a voice coil motor, the characteristic that defines amount of movement of the voice coil motor is referred to as a moving force gain $K_f$. I have noticed that the moving force gain $K_f$ introduces a slight error into the servo control apparatus during movement of the head between tracks, which can, in turn, precipitate a subsequent error while performing the on-track operation of the head during the track following operational mode. Moreover, conventional servo control gain correction techniques fail to correct for variation in the moving force gain $K_f$ of the actuator, and unexpected error can be generated during the track following operational mode due to the consequent variation in the overall control gain.

SUMMARY OF THE INVENTION

It is one object of the present invention to provide an improved servo control gain correction apparatus and method for a disk recording system.

It is another object is to provide a servo control gain correction method which is capable of suppressing generation of error caused by variation in a moving force gain $K_f$ of an actuator.

It is yet another object is to provide a circuit and process able to obtain a measure for calibrating the variation of moving force gain $K_f$ of an actuator during self-calibration of the disk recording system.

These and other objects may be achieved according to the principles of the present invention by providing a servo control gain correction circuit and process in a disk recording system for reading and writing information onto a disk recording medium by driving an actuator. A given reference current is supplied to the actuator while the disk is rotated at a constant speed during a reference time and a moving distance of the actuator on the disk recording medium is calibrated. A servo control correction gain of the actuator is obtained in proportion to a given reference direct current gain value by using a ratio between a given reference moving distance and the calibrated moving distance. The actuator is driven in correspondence with servo control correction gain when moving a head to a target position indicated by an expressed desire to read and write data on the disk recording medium.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

Figure 1:
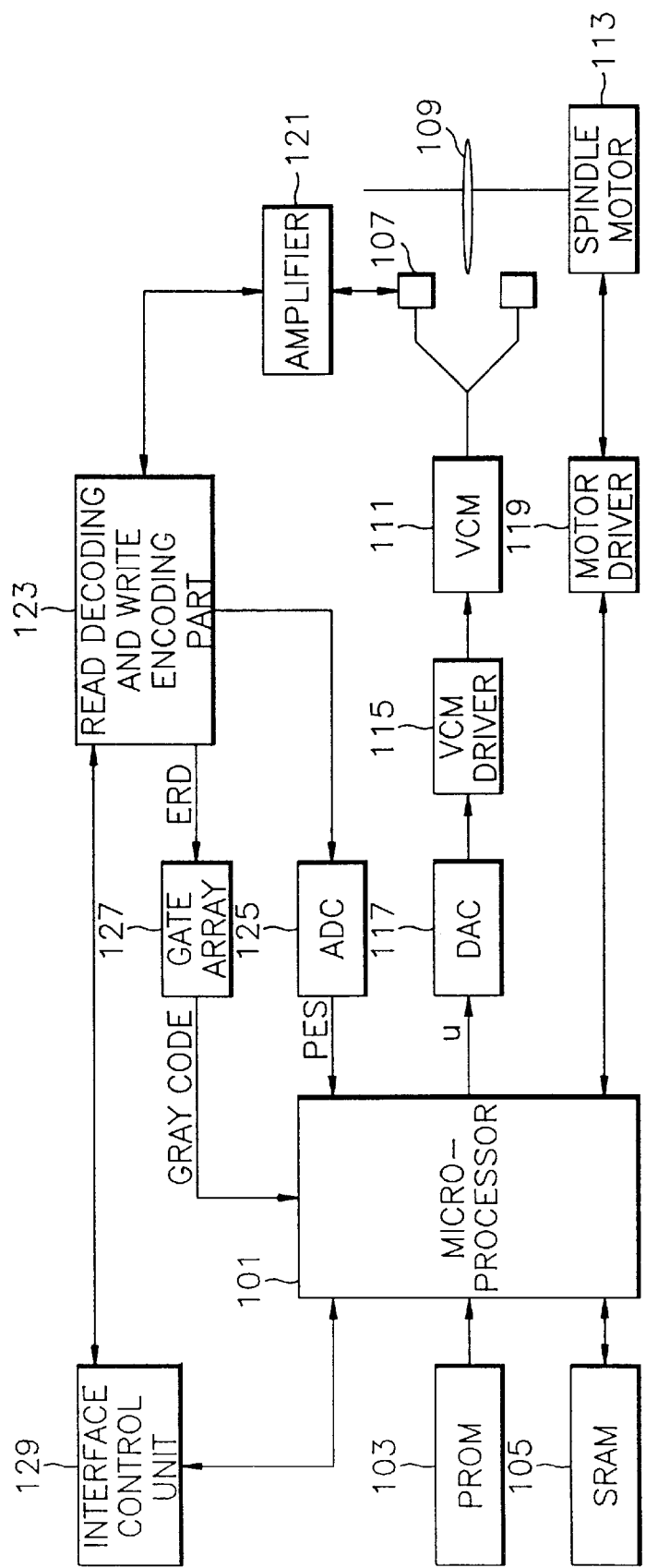
FIG. 1 is a block diagram illustrating a representative servo control for a typical disk recording system.

Turning now to the drawings, FIG. 1 illustrates as a block diagram, a of a typical servo control configuration for a disk recording system. A microprocessor 101 executes overall operation of the disk recording system on the basis of a control program stored in a programmable read only memory (PROM) 103, and is connected to a static random access memory (SRAM) 105 for storing control variables such as a velocity table discussed hereinafter. A motor driver 119 activates a spindle motor 113 to rotate a disk recording medium 109 about a driving axis under the control of microprocessor 101. Additionally, a digital control signal u is generated by microprocessor 101 to move a head 107 radially across the disk 109 to read or write data at a target position. The digital control signal u is digital-to-analog converted by DAC 117 into an analog signal for moving the head 107 under the control of an actuator. Typically, the actuator has a voice coil motor (VCM) 111 activated by a VCM driver.

An interface control unit 129 transmits and receives data to and from an external data input unit (not shown) under the control of microprocessor 101, and is connected to a read decoding and write encoding part 123. The read decoding and write encoding part 123 encodes data to be written to disk 109 in the form of an analog flux conversion signal output to head 107 through an amplifier 121, and also converts an analog signal from the amplifier 121 read by head 107 to a digitally encoded read data (ERD) signal.

A gate array 127 connected to the read decoding and write encoding part 123 receives the ERD signal and outputs to microcomputer 101 a Gray code from servo information and timing clock information detected within the servo area of the disk 109. An analog-to-digital converter (ADC) 125 converts an analog servo reading signal received from the read decoding and write encoding part 123 into a digital position error signal (hereinafter, PES) supplied to the microprocessor 101. Microprocessor 101 executes the overall control operation in a servo control apparatus of the disk recording system.

Figure 2:
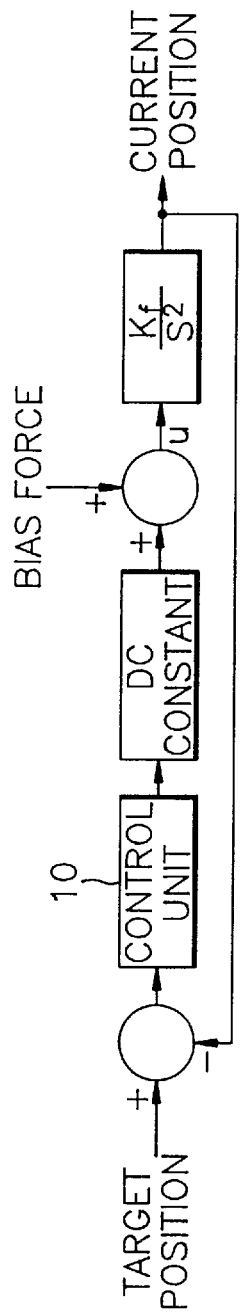
FIG. 2 is a block diagram illustrating a representative servo control configuration for a disk recording system.

FIG. 2 is a block diagram illustrating a general servo control configuration of a disk recording system. A control unit 10, implemented as a servo control algorithm in the microprocessor 101, receives a difference value between a target position and a current position to obtain a target velocity for the movement of the head 107. The target velocity is generally obtained from a velocity table stored in static random access memory SRAM 105 of FIG. 1, and is indicative of a velocity corresponding to a moving distance. Control unit 10 outputs an actuator driving control value corresponding to the target velocity, which is multiplied by a DC direct current (DC) gain of the actuator. The multiplied value is added to a bias force $F_B$ and input to the actuator as a digital control input signal u. The above mentioned DC gain represents a fixed control gain of mechanisms of the servo control apparatus.

In the general servo control apparatus for a disk recording system having the configuration of FIG. 1, the bias force $F_B$ varies in accordance with the position of the actuator and has great influence on the variation of the overall servo control gain. This is closely associated with the stability and performance of the disk recording system. The bias force $F_B$ may be generated by the elasticity of a flexible printed circuit board (FPCB) provided to supply current to the actuator and is variable in accordance with the position of the actuator. The bias force $F_b$ is removed if an offset is applied equal to the bias force $F_B$ when the head 107 is centered on a target track. In such conventional systems, this servo control gain correction technique is performed to maintain the head on-track, by calculating the bias force $F_B$ on the basis of the position of the actuator, through self-calibration during an initial operation of the system.

Figure 3:
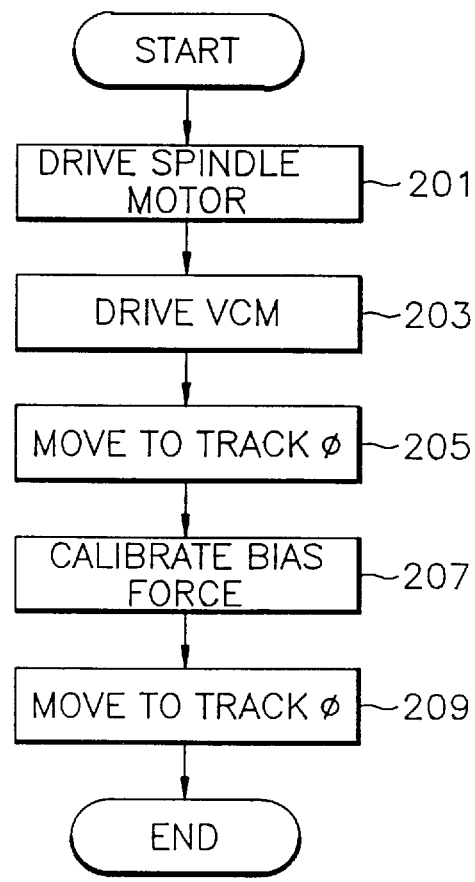
FIG. 3 is a simplified flow chart illustrating salient steps in a conventional servo control gain correction process.

FIG. 3 is a flow chart illustrating a conventional servo control gain correction method for calculating the bias force $F_B$ in accordance with the position of the actuator through self-calibration after an initial operation of the system. At step 201, the microprocessor 101 drives the spindle motor 113 to reach a predetermined speed. While maintaining a constant speed, the microprocessor 101 at step 203 drives voice coil motor 111 to move the head 107 outwardly from the center of the disk 109, until the head 107 reaches a track φ at step 205, as determined from servo information recorded on the disk 109. At step 207, the microprocessor 101 calibrates the bias force $F_B$ while moving head 107 inwardly from track φ to other track units, and stores the calibrated values in a bias table within the static random access memory SRAM 105. At step 209, after the microprocessor 101 completes the calibration of the bias force $F_B$, voice coil motor 111 is driven to return the head to track φ in preparation for reading and writing data on the disk 109.

As was noted in the background discussion, the several variations in designs of voice coil motor 111 vary somewhat in their characteristics, without any uniform standard. When a constant current is applied to the VCM 111, the characteristic for the amount of movement of voice coil motor 111 is referred to as a moving force gain $K_f$. The moving force gain $K_f$ introduces a slight error into the performance of the servo control apparatus during movement of head between tracks, and that error can easily develop into subsequent error in track centering during the track following operation. The conventional servo control gain correction method discussed above fails to correct for variation in the moving force gain $K_f$ of the actuator, and unexpected error can be generated during the track following operation due to the consequent variation in the overall control gain.

Figure 4:
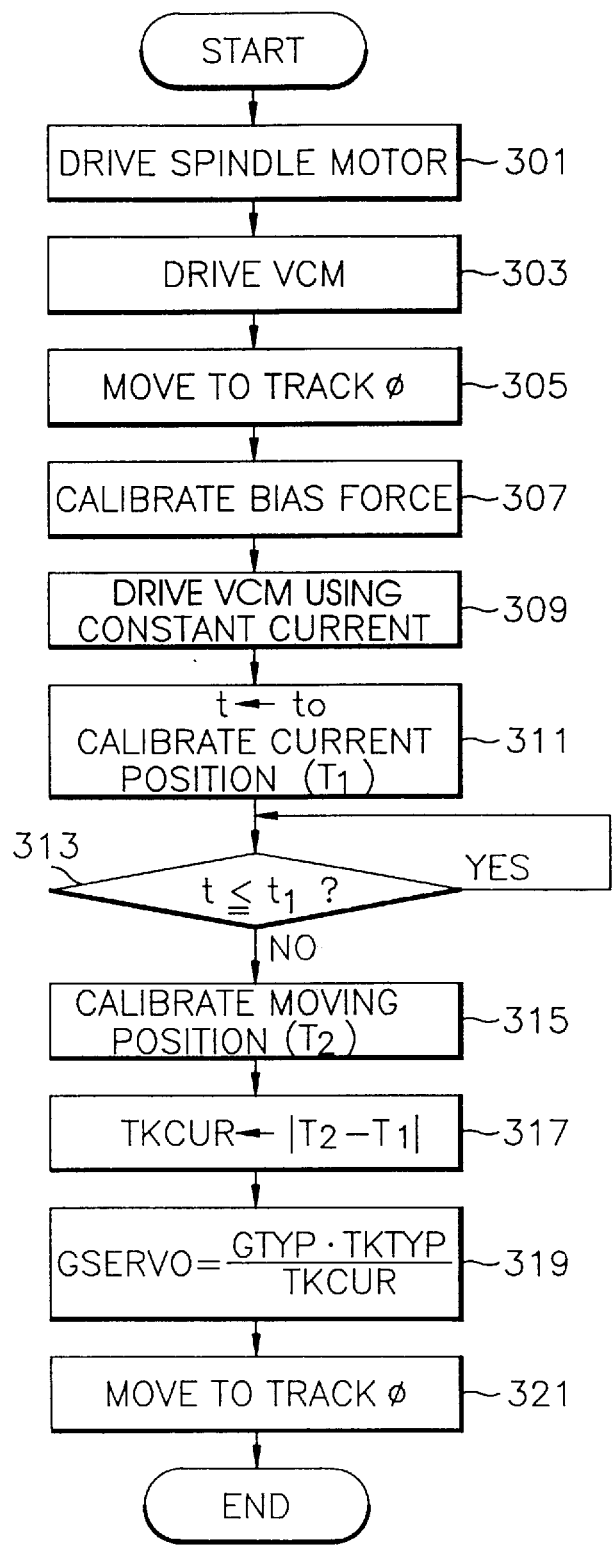
FIG. 4 is a flow chart illustrating the practice of a preferred embodiment of the present invention.

Turning now to FIG. 4, a flow chart illustrates the practice of a preferred embodiment in accordance with the principles of the present invention. At step 301, the microprocessor 101 drives the spindle motor 113 to a predetermined constant speed. While maintaining the constant speed, the microprocessor 101 at step 103 drives voice coil motor 111 to move the head 107 away from the center of the disk 109. At step 305, the head 107 moves to track φ based upon the servo information recorded on the disk 109 in order to execute an initial self-calibration. At step 307, the microprocessor 101 calibrates the bias force $F_B$ of moving phases with given distances and stores the same bias force $F_B$ a bias table within static random access memory SRAM 105.

At step 309, the microprocessor 101 generates a predetermined control signal by supplying a constant current I to voice coil motor 111. At step 311, microprocessor 101 sets a time variable t to an initial time t0 and calibrates a track number T1 of the current position. While voice coil motor 111 is continuously driven by the constant current I, microprocessor 101 rigorously increments the time variable t and waits at step 313 until the value of the time variable t has reached a completion time t1. Then, microprocessor 101 calibrates at step 315 a track number T2 of the current moving position and stops the supply of the constant current I. At step 317, microprocessor 101 calculates a current moving distance TKCUR equal to the quantity (T2- T1), which represents the number of tracks over which the head moved during the time period between t0 to t1.

At step 319, microprocessor 101 determines the servo control correction gain GSERVO according to the following equation (1), in which the reference symbol GTYP is a servo control direct current (DC) gain of a standard disk recording system, and TKTYP is a reference moving distance of the head determined by the manufacturer while the constant current I was supplied to VCM 111 during the driving interval of time between t0 and t1.

$$GSERVO = GTYP \times \frac{TKTYP}{TKCUR} \tag{1}$$

The disk recording system is made to satisfy a standard structure, and the GTYP, TKTYP and the value of the interval of time (t1 - t0) are stored by the manufacturer as the initial values in the programmable read only memory PROM 103 and used upon the self-calibration.

At step 321, microprocessor 101 drives voice coil motor 111 to return read and write head 107 to track φ in preparation for reading or writing data upon the disk. Thereafter, microprocessor 101 performs each servo control mode in correspondence with the servo control correction gain value GSERVO while executing servo control for reading and writing data.

In the practice of the present invention described herein, the head is moved at step 305 to track φ in order to calibrate the bias force $F_B$. This movement of the head may however, be made on the basis of any other track position.

While driving the actuator to move the read and write head according to the preferred embodiment of the present invention, the same velocity table and moving direction should be used as are determined when the reference values are calibrated while using the standard disk recording system.

According to the principles of the present invention, the disk recording system moves the head to a determined distance and then drives the actuator during a given period of time while a constant current input is maintained, so that a moving distance of the head is considered as an acceleration capability of the actuator. The moving distance is compared with a reference moving distance, thereby obtaining a corrected moving force gain of the actuator.

As is apparent from the foregoing, the present invention can improve the stability of a disk recording system, since the servo control moving force gain is corrected during self-calibration of the disk recording system.

What is claimed is:

1. A servo control gain correction method of a disk recording system driving an actuator supporting a head to read and write information on a recording medium, said method comprising the steps of:

driving said actuator to move the head to a target track on said recording medium designated to begin reading and writing information on said recording medium while said recording medium is being rotated at a constant speed:

determining a current moving distance value of said actuator on said recording medium while said the head moves to the target track on said recording medium during a reference time period, indicating the number of tracks over which the head traverses during said reference time period;

obtaining a servo control correction gain based upon a reference direct current gain set for said disk recording system and a ratio of a reference moving distance value set by a manufacturer and said current moving distance value; and calibrating a bias force applied to said actuator in accordance with said servo control correction gain to settle the head onto a data line of said target track to begin reading and writing data information on and from said recording medium.

2. The method as defined in claim 1, further comprised of obtaining said servo control correction gain is determined by the following equation:

Correction Gain = Reference Direct Current Gain × $\frac{\text{Reference Moving Distance Value}}{\text{Current Moving Distance Value}}$ 3. A servo control gain correction method, 1 the steps of:

rotating a recording medium having a plurality of recorded tracks containing servo information;

supplying a constant reference current to an actuator controlling a radial movement of a head over the recording medium;

determining a first track position of the head;

determining a second track position of the head after the head traverses from the first track position for a reference time period;

determining a current moving distance value of said actuator on said recording medium indicating the number of tracks over which the head traverses from the first track position to the second track position during said reference time period;

obtaining a servo control correction gain of said actuator based upon a reference direct current gain set for said disk recording system and a ratio of a reference moving distance value set by a manufacturer and said current moving 1 value; and calibrating a bias force applied to said actuator in accordance with said servo control correction gain to settle the head on a data line of a target position to begin reading and writing data information on and from said recording medium.

4. The servo control gain correction method of claim 3, further comprised of said current moving distance value being determined by:

reading said servo information from said recording medium to determine an initial track number corresponding to the position of the head at the beginning of said reference time period;

reading said servo information from said recording medium to determine a final track number corresponding to the position of the head at the end of said reference time period; and subtracting said initial track number from said final track number to obtain said current moving distance value.

5. The servo control gain correction method of claim 4, further comprised of said reference direct current gain corresponding to a servo control direct current gain of standard recording media, and said reference moving distance value corresponding to a preset value determined by a manufacturer.

6. A servo control gain correction method, comprising:

supplying a constant reference current to an 1 controlling radial movement of a head relative to a recording medium having a plurality of tracks recorded thereon servo information as said recording medium is being rotated at a constant speed;

determining a current radial moving distance of said head during a reference time period in response to said constant reference current supplied to said actuator;

obtaining a corrected gain value for said actuator by adjusting a stored reference gain value of said actuator in accordance with a ratio of a reference radial moving distance of said head previously determined and said current radial moving distance in response to said constant reference current supplied to said actuator during said reference time period; and driving said actuator to settle said head on a target position of said recording medium to begin reading and writing data information on and from said recording medium by supplying said actuator a control signal adjusted by said corrected gain value.

7. The servo control gain correction method of claim 6, wherein said step of determining a current radial moving distance comprises:

reading said servo information from said recording medium to determine an initial track number corresponding to the position of said head at the beginning of said reference time period;

reading said servo information from said recording medium to determine a final track number corresponding to the position of said head at the end of said reference time period; and determining said current radial moving distance by subtracting said initial track number from said final track number.

8. The servo control gain correction method of claim 6, further comprised of said current radial moving distance being determined by:

reading said servo information from said recording medium to determine an initial track number corresponding to the position of the head at the beginning of said reference time period;

reading said servo information from said recording medium to determine a final track number corresponding to the position of the head at the end of said reference time period; and subtracting said initial track number from said final track number to obtain said current radial moving distance.

9. The servo control method of claim 8, further comprised of said stored reference gain value corresponding to a servo control direct current gain of standard recording media, and said reference radial moving distance corresponding to a preset value determined by a manufacturer.

10. A disk apparatus, comprising:

a spindle motor for rotating a recording medium having a plurality of concentrically spaced data tracks, each data track including a plurality of circumferential data sectors and a plurality of circumferential servo sectors disposed therebetween, each servo sector having recorded thereon servo information;

an actuator assembly including therein a transducer head arranged to move along a radial line of said recording medium when said recording medium is loaded in the disk apparatus, for moving said transducer head in a radial direction of said recording medium in response to said servo information recorded on the servo sectors of said recording medium so as to read and write data information on and from the data sectors of said recording medium; and controller means for controlling movement of the transducer head, the rotation of the spindle motor, and for controlling servo gain correction of the transducer head to settle the transducer head on a target position of said recording medium after the transducer head is moved to the target position of said recording medium to begin reading and writing data information on and from the data sectors of said recording medium, said controller means controlling servo gain correction of the transducer head by:

determining a current moving distance of said transducer head;

obtaining a corrected gain value by adjusting a reference gain value of said recording medium in accordance with a ratio of said current moving distance and a reference moving distance of said transducer head; and driving said actuator assembly to settle said transducer head on the target position of said recording medium in response to a control signal adjusted by said corrected gain value.

11. The disk apparatus of claim 10, further comprised of said controller means determining a current radial moving distance by:

reading said servo information from said recording medium to determine and initial track number corresponding to the position of said transducer head at the beginning of a reference time period;

reading said servo information from said recording medium to determine a final track number corresponding to the position of said transducer head at the end of said reference time period; and determining said current moving distance by subtracting said initial track number from said final track number.

12. The disk apparatus of claim 10, further comprised of said reference gain value corresponding to a servo control direct current gain of standard recording media, and said reference moving distance of said transducer head corresponding to a preset value determined by a manufacturer.

* * * * *